(12) United States Patent
Hoffmann

(10) Patent No.: US 10,185,478 B2
(45) Date of Patent: Jan. 22, 2019

(54) CREATING A FILTER FOR FILTERING A LIST OF OBJECTS

(71) Applicant: SAP SE, Walldorf (DE)

(72) Inventor: Martin Hoffmann, Heidelberg (DE)

(73) Assignee: SAP SE, Walldorf (DE)

( * ) Notice: Subject to any disclaimer, the term of this patent is extended or adjusted under 35 U.S.C. 154(b) by 351 days.

(21) Appl. No.: 14/494,596

(22) Filed: Sep. 24, 2014

(65) Prior Publication Data

US 2016/0085785 A1    Mar. 24, 2016

(51) Int. Cl.
*G06F 17/30* (2006.01)
*G06F 3/0484* (2013.01)

(52) U.S. Cl.
CPC .... *G06F 3/04842* (2013.01); *G06F 17/30398* (2013.01)

(58) Field of Classification Search
None
See application file for complete search history.

(56) References Cited

U.S. PATENT DOCUMENTS

| | | | |
|---|---|---|---|
| 5,455,945 A | 10/1995 | VanderDrift | |
| 5,787,411 A * | 7/1998 | Groff | G06F 17/30398 |
| 6,269,407 B1 | 7/2001 | Cink et al. | |
| 6,279,016 B1 | 8/2001 | De Vorchik et al. | |
| 7,080,328 B1 | 7/2006 | Sawyer | |
| 7,139,762 B2 | 11/2006 | Labarge et al. | |
| 7,477,234 B2 | 1/2009 | Becker | |
| 8,091,044 B2 | 1/2012 | Haynes et al. | |
| 8,543,591 B2 | 9/2013 | Nandy et al. | |
| 8,612,438 B2 | 12/2013 | Folting et al. | |
| 8,635,530 B2 | 1/2014 | Brugler et al. | |
| 8,745,482 B2 * | 6/2014 | Ellis | G06F 17/246 715/212 |
| 8,849,837 B2 * | 9/2014 | Dua | G06F 17/30557 707/750 |
| 8,943,370 B2 * | 1/2015 | Burghard | G06F 11/3072 714/45 |
| 9,229,971 B2 * | 1/2016 | Woody | G06F 17/3015 |
| 2003/0229848 A1 | 12/2003 | Arend et al. | |
| 2006/0122967 A1 | 6/2006 | Purkayastha et al. | |
| 2012/0167006 A1 | 6/2012 | Tillert et al. | |
| 2013/0111320 A1 * | 5/2013 | Campbell | G06F 17/245 715/212 |
| 2013/0152088 A1 | 6/2013 | Gkantsidis et al. | |
| 2015/0032609 A1 * | 1/2015 | Abuelsaad | G06Q 20/102 705/40 |

* cited by examiner

*Primary Examiner* — Mark D Featherstone
*Assistant Examiner* — Ranjit P Doraiswamy
(74) *Attorney, Agent, or Firm* — Buckley, Maschoff & Talwalkar LLC

(57) ABSTRACT

Various embodiments of system and methods of creating a filter for a list of objects are described herein. The method includes receiving a selection of a set of objects from the list of objects composed of one or more fields having field values, and comparing the field value in each field of an object with the field values in each of the corresponding fields of the other objects in the set of objects. Based on the comparison, identifying that the field values are the same across the one or more fields of the set of objects. The method further includes generating a list of filter criteria based on the identified field values. The filter may be created using the list of filter criteria.

12 Claims, 13 Drawing Sheets

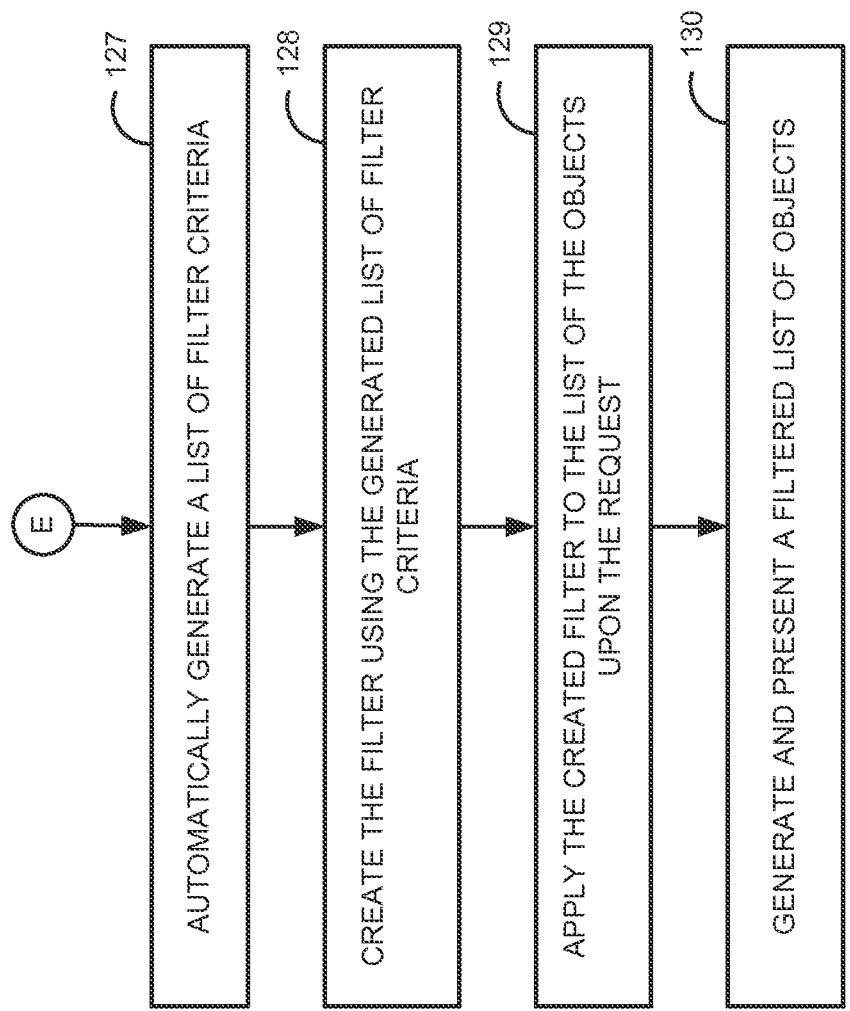

| | EMP ID 201 | EMP NAME 202 | GENDER 203 | HIRE DATE 204 | DEPARTMENT 205 | SALARY 206 | JOB TYPE 207 |
|---|---|---|---|---|---|---|---|
| ☐ | 704100 | MARTIN | MALE | 6/23/2014 | MARKETING | 20000 | CONTRACT |
| ☑ | 705120 | RON | MALE | 05/22/2014 | ADMINISTRATION | 15000 | PERMANENT |
| ☐ | 706122 | LINDA | FEMALE | 9/23/2013 | FINANCE | 28000 | PERMANENT |
| ☐ | 706105 | ALICE | FEMALE | 6/23/2013 | PRODUCTION | 15000 | CONTRACT |
| ☐ | 706109 | MIKE | MALE | 6/13/2013 | ADMINISTRATION | 10000 | PERMANENT |
| ☐ | 706120 | KIM | FEMALE | 4/23/2013 | MARKETING | 8000 | CONTRACT |
| ☐ | 706125 | DAVID | MALE | 4/13/2013 | ADMINISTRATION | 2000 | PERMANENT |
| ☐ | 706132 | CHRIS | MALE | 6/18/2013 | FINANCE | 40000 | PERMANENT |
| ☐ | 706122 | JOE | MALE | 7/9/2013 | PRODUCTION | 22000 | CONTRACT |
| ☑ | 706111 | JOHN | MALE | 5/18/2013 | ADMINISTRATION | 19000 | CONTRACT |
| ☑ | 706189 | STEVEN | MALE | 5/20/2014 | ADMINISTRATION | 18000 | PERMANENT |

(NEW 212) (EDIT 213) (FILTER 214) (CREATE FILTER 209)

(CHECK ALL 210) (CLEAR ALL 211) (CLOSE 215)

FILTER NAME: MALE ADMIN PER 305

FIELD

☐ GENDER
☐ DEPARTMENT
☐ JOB TYPE

315

FIELD CRITERION

MALE
ADMINISTRATION
PERMANENT

310

EDIT 320  SAVE 325  CANCEL 330

300

| | EMP ID | EMP NAME | GENDER | HIRE DATE | DEPARTMENT | SALARY | JOB TYPE |
|---|---|---|---|---|---|---|---|
| ☐ | 705120 | RON | MALE | 05/22/2014 | ADMINISTRATION | 15000 | PERMANENT |
| ☐ | 706109 | MIKE | MALE | 6/13/2013 | ADMINISTRATION | 10000 | PERMANENT |
| ☐ | 706125 | DAVID | MALE | 4/13/2013 | ADMINISTRATION | 2000 | PERMANENT |
| ☐ | 706111 | JOHN | MALE | 5/18/2013 | ADMINISTRATION | 19000 | PERMANENT |
| ☐ | 706189 | STEVEN | MALE | 5/20/2014 | ADMINISTRATION | 18000 | PERMANENT |

TAB 1

NEW | EDIT | FILTER | CREATE FILTER 420

CHECK ALL | CLEAR ALL | CLOSE

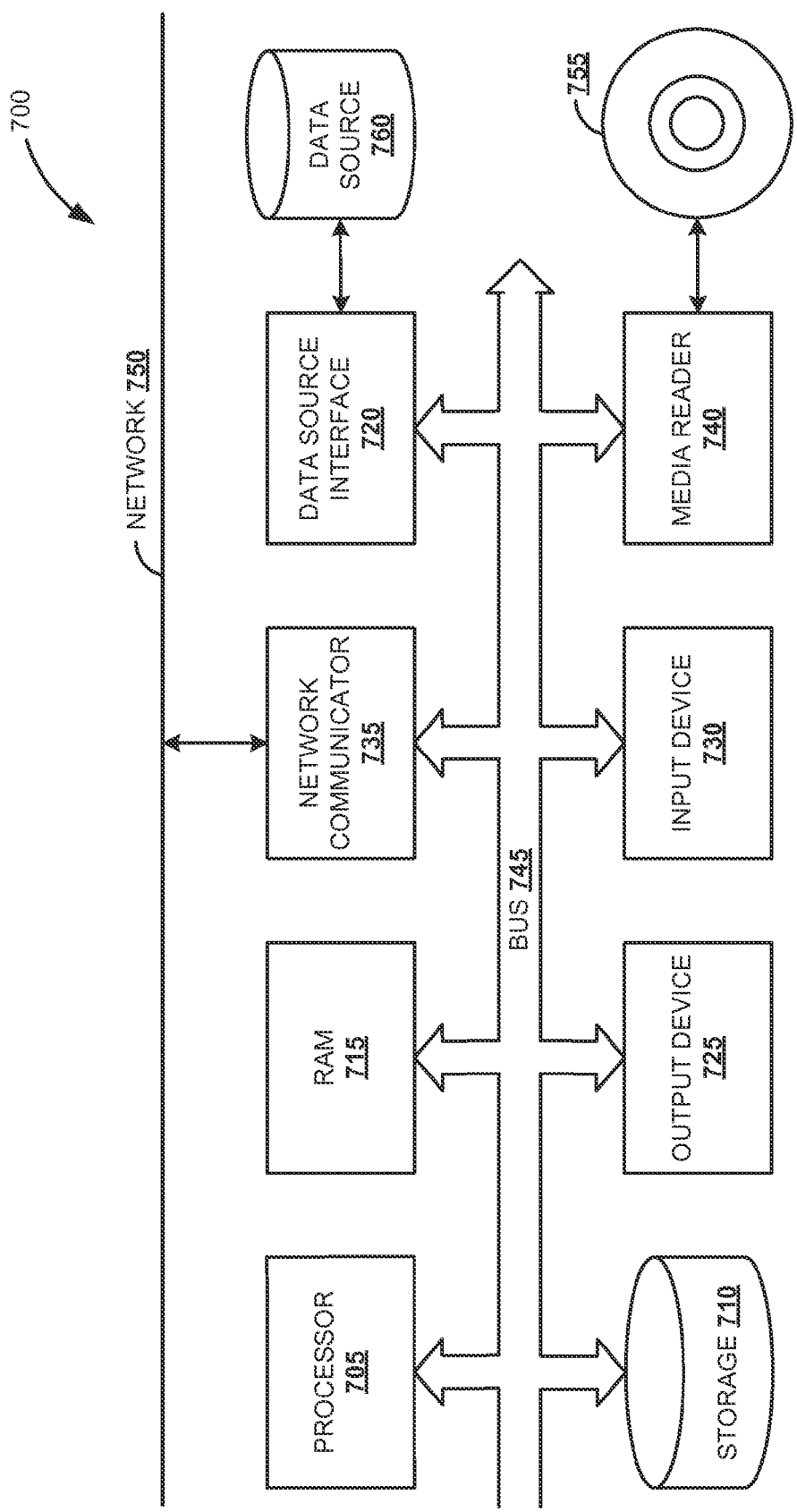

CREATING A FILTER FOR FILTERING A LIST OF OBJECTS

FIELD

The field generally relates to processing a list of objects. More specifically, the field relates to automatically generating a list of filter criteria for creating a filter for filtering the list of objects.

BACKGROUND

In order to manage large quantities of data, computer software applications, such as spreadsheet and database applications have been developed to organize and store the data in a logical manner. Typical spreadsheet and database applications comprise a number of objects of information, wherein each object comprises a number of fields having field values (i.e., data). In the context of database applications, a database management system provides software tools to manipulate a database. A typical database management system provides a filter tool for enabling a user to create a filter by defining filter criteria.

Conventionally, the user manually enters the filter criteria for filtering the field values in the database objects and creates the filter. For example, the user may manually parse through the database objects and identify one or more field values as the filter criteria. Upon applying the filter to the database objects, the field values that satisfy the filter criteria are identified and the corresponding objects are displayed exclusive of the other database objects. For example, a database of employees may have an object for each employee where each object contains fields designating specifics about the employee, such as employee name, employee ID, department, and so on. If the user chooses to filter out objects of the employees based on one or more departments specified in the department field, then the user manually selects at least one or more departments as filter criteria and creates a filter.

However, the manually entering the filter criteria to create the filter becomes a laborious and time consuming task when the database has a large number of objects and/or when the objects have a large number of fields.

SUMMARY

Various embodiments of the system and methods of creating a filter for filtering a list of objects are described herein. In an embodiment, the method includes receiving a selection of a set of objects from the list of objects. Based on the selection, a field value in each field of an object is compared with field values in each of the corresponding fields of the other objects in the set of objects. Based on the comparison, identifying that the field values are the same across the one or more fields of the set of objects. The method further includes automatically generating a list of filter criteria based on the identified field values. Further, the filter is created using the generated list of filter criteria. The created filter may be applied to the list of objects to generate a filtered list of objects.

In another embodiment, the method includes receiving a selection of a set of objects from a list of objects, and determining the data type of field values in each field of the selected set of objects. Based on the data type of the field values in the each field, an algorithm for comparing the field values in the each field of the set of objects is selected. Upon selecting the relevant algorithm for each type of the field value, the field value in each field of an object is compared with the field values in each of the corresponding fields of the other objects in the set of objects based on the selected algorithm. Based on the comparison, determining that the field values are the same across the one or more fields of the set of objects. The method further includes automatically generating a list of filter criteria based on the same field values. Further, the filter is created using the generated list of filter criteria. The created filter may be applied to the list of objects to generate a filtered list of objects.

These and other benefits and features of embodiments will be apparent upon consideration of the following detailed description of preferred embodiments thereof, presented in connection with the following drawings.

BRIEF DESCRIPTION OF THE DRAWINGS

The claim set forth the embodiments with particularity. The embodiments are illustrated by way of examples, and not by way of limitation in the figures of the accompanying drawings in which like references indicate similar elements. The embodiments, together with its advantages, may be best understood from the following detailed description taken in conjunction with the accompanying drawings.

FIG. 1A to 1G is a flow diagram illustrating a process of creating a filter for filtering a list of objects, according to an embodiment.

FIG. 2 is an exemplary user interface depicting a tabular view of a list of objects of a data source, according to an embodiment.

FIG. 3 is an exemplary user interface depicting a filter created for filtering a list of objects, according to an embodiment.

FIG. 4 is an exemplary user interface depicting a tabular view of a filtered list of objects, according to an embodiment.

FIG. 5 is an exemplary user interface depicting a filter created for filtering a list of objects, according an embodiment.

FIG. 7 is a block diagram illustrating a computing environment in which the techniques described for creating a filter for filtering a list of objects can be implemented, according to an embodiment.

DETAILED DESCRIPTION

Figure 1A:
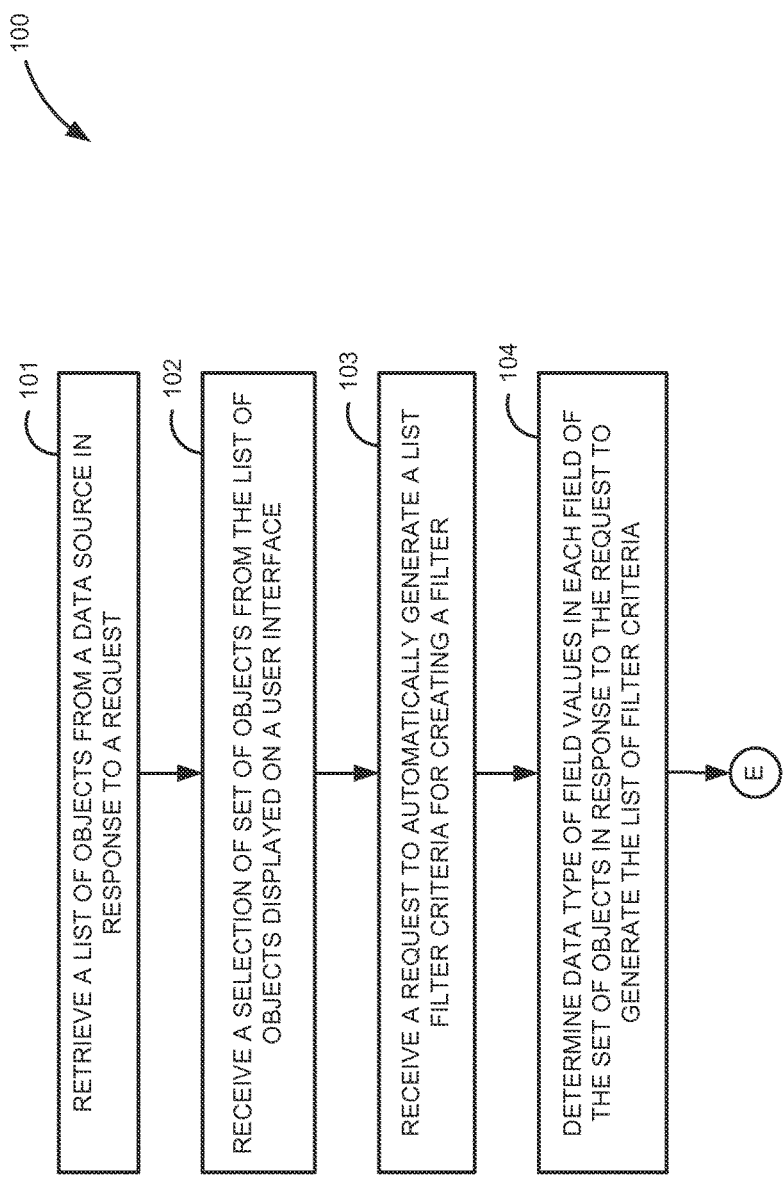
Figure 1B:
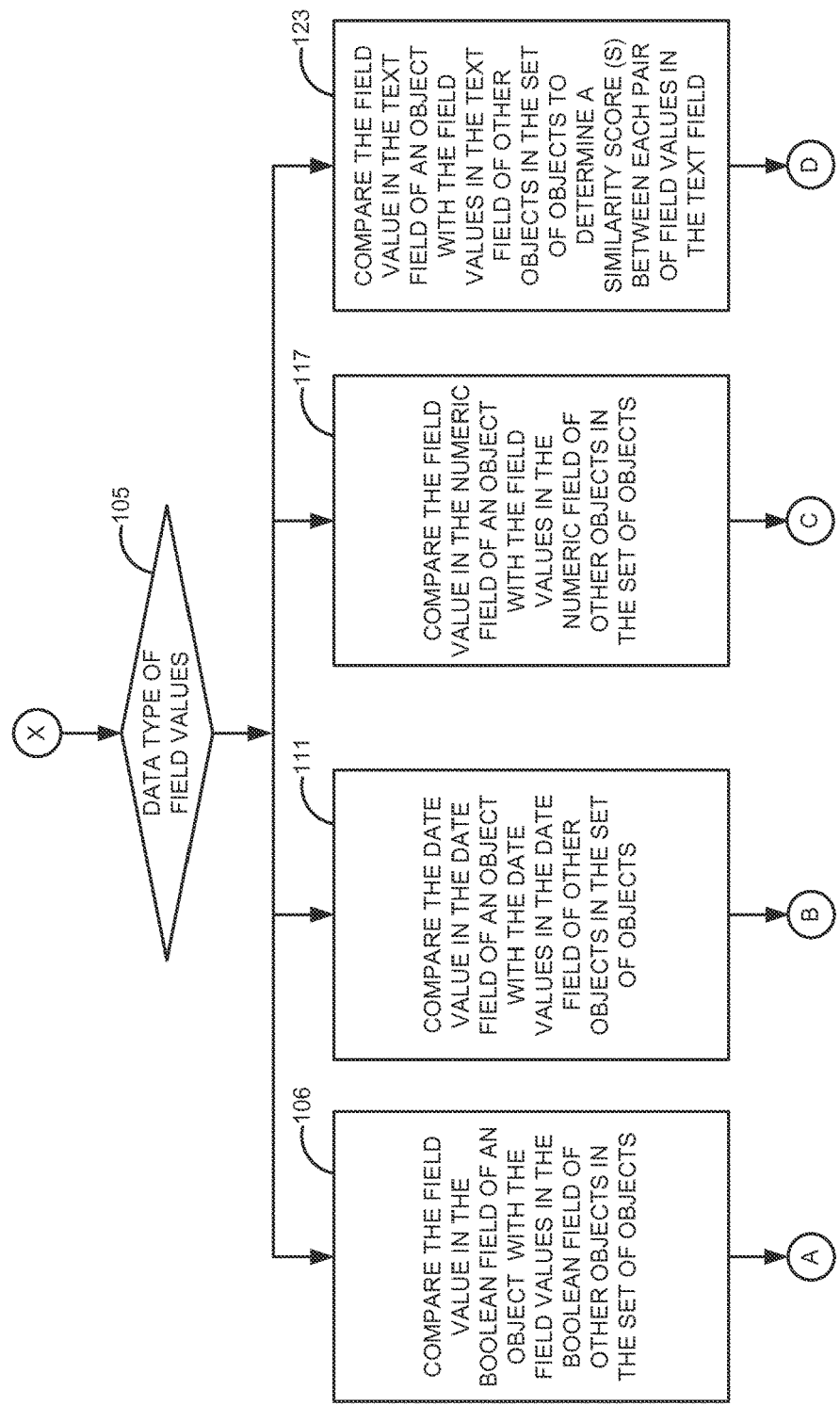
Figure 1C:
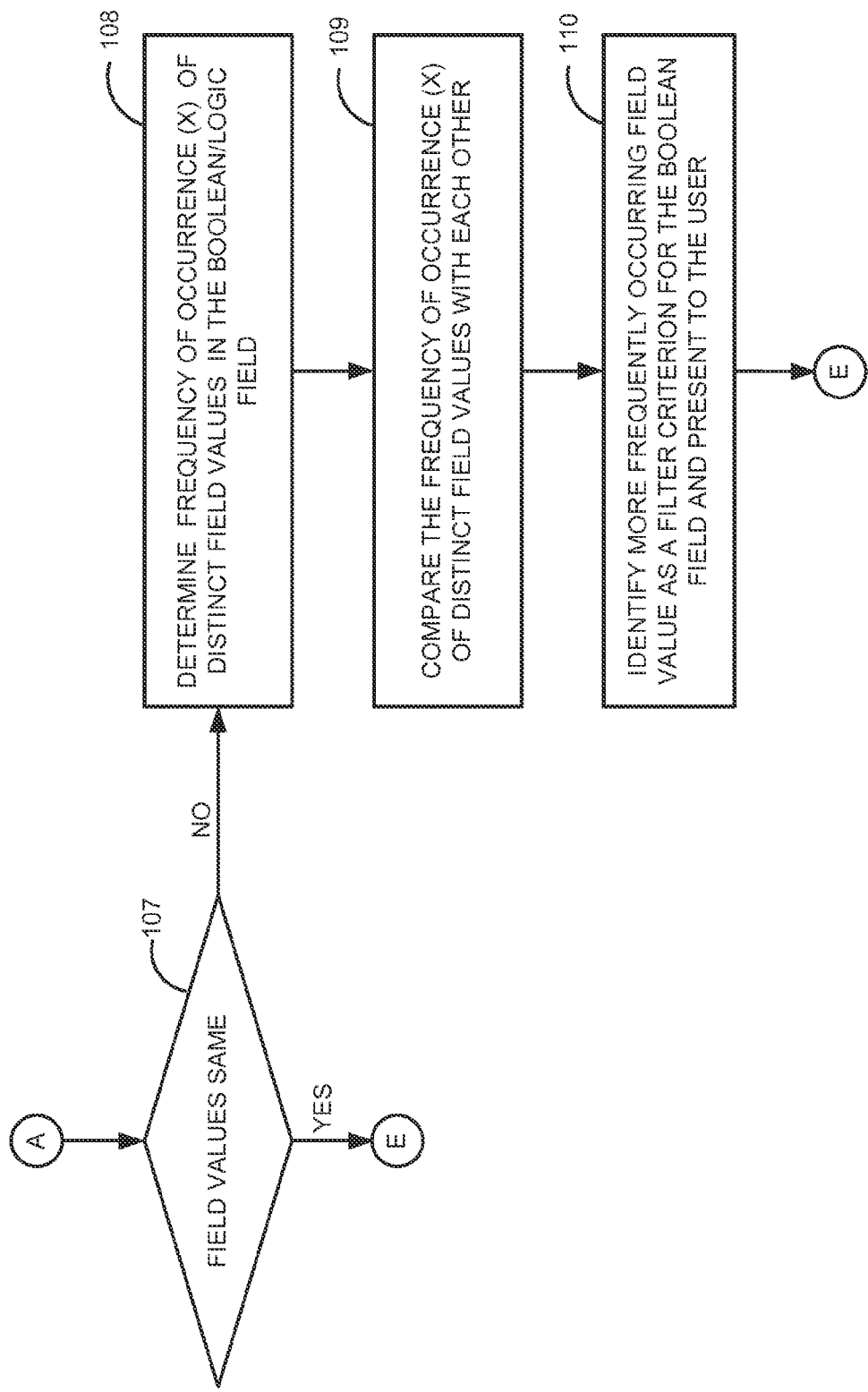
Figure 1D:
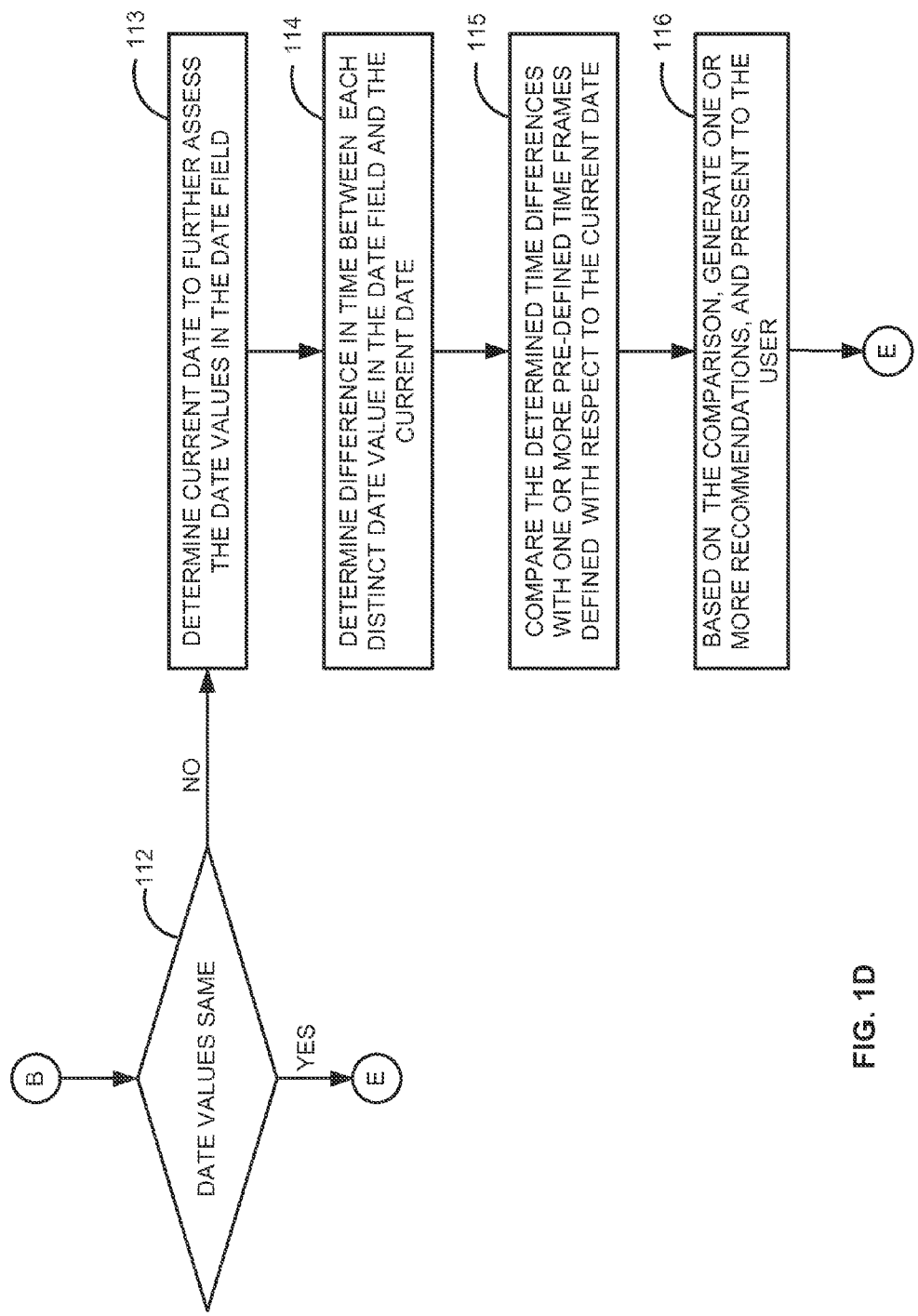
Figure 1E:
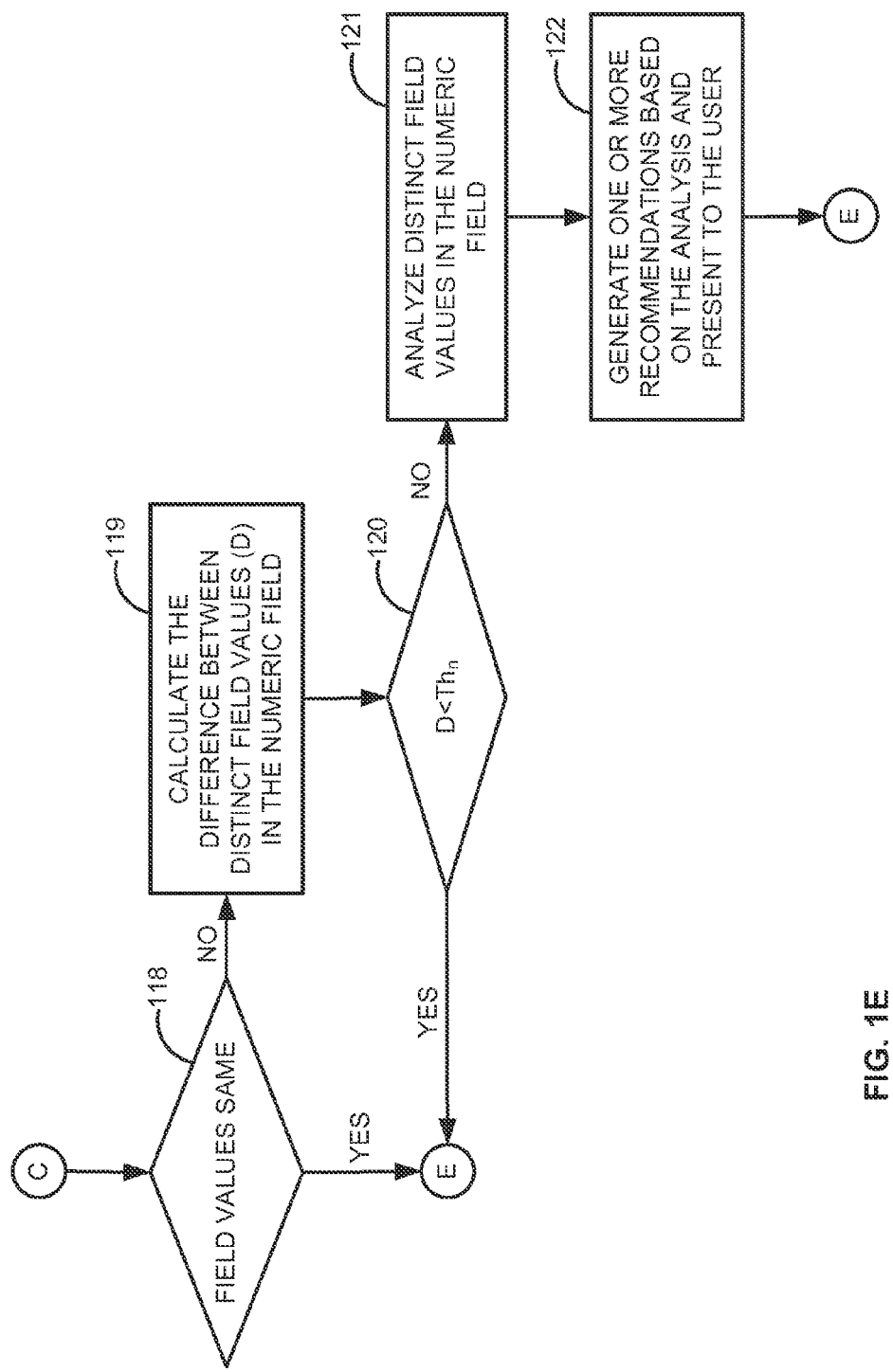
Figure 1F:
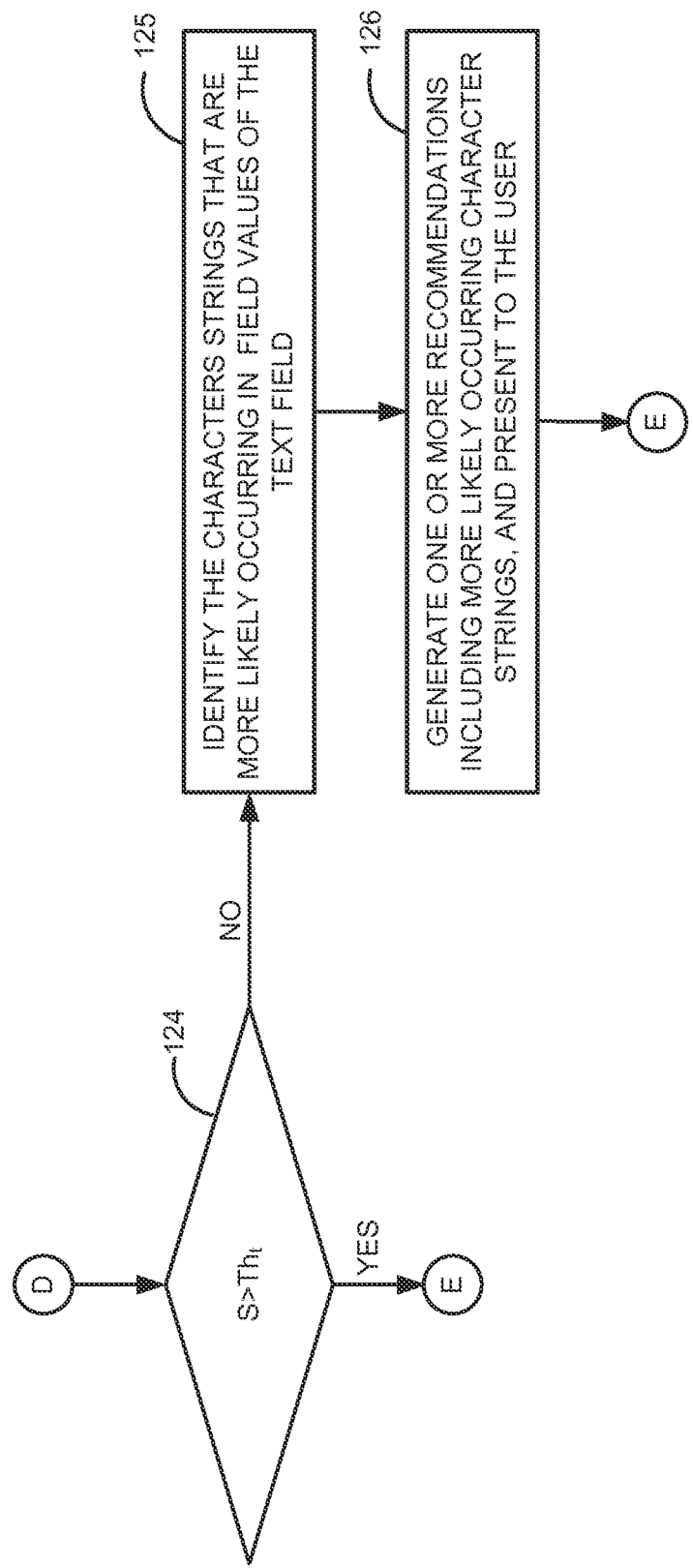

Various embodiments of system and methods of creating a filter for filtering a list of objects are described herein. Each object from the list of the objects includes one or more fields having field values (also referred to as data). In an embodiment, a filter is created using a list of filter criteria which are automatically generated using a filtering tool. In an aspect, the list of filter criteria may be automatically generated based on identifying field values that are same across the one or more fields. In an embodiment, a user may be provided with the generated list of filter criteria, which may be edited by the user prior to filtering the list of objects. In another embodiment, the user may be provided with the generated list of filter criteria, which may be edited by the user prior to creating the filter. In the following description, numerous specific details are set forth to provide a thorough understanding of embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment", "an embodiment", and similar phrases, means that a particular feature, structure, or characteristic described in connection with the embodiment is included in a least one embodiment of the one or more embodiments. Thus, the appearances of these phrases in various places throughout this specification are not necessarily all referring to the same embodiment. Furthermore, the particular features, structures, or characteristics may be combined in any suitable manner in one or more embodiments.

FIG. 1A to 1G is a flow diagram 100 illustrating a process of creating a filter for filtering a list of objects, according to an embodiment. The process implemented by a computer or any other electronic device having processing capabilities, includes at least the following process illustrated with reference to process elements 101-130. At 101, the list of objects may be retrieved from a data source in response to a request. For example, the data source may be a remote database, a local database stored in a memory of the computer, word processor documents, spreadsheet programs and the like. The list of objects may be retrieved from the remote database through a communication network. In an embodiment, the list of objects retrieved from the data source is presented to the user in a tabular form where the list of objects is composed of one or more fields having field values. For example, an object retrieved from an employee database may have fields designating specifics about the employee, such as "Employee ID", "Hire date", "Address", "Department", etc.

At 102, a selection of one or more objects from the list of the objects displayed on the user interface may be received. For example, the user interface may provide an option to select or de-select the one or more objects from the list of objects displayed on the user interface. In an embodiment, each object from the list of objects may be associated with a check box. The user may select an object from the list of the objects by selecting the check box associated with the object. The selected one or more objects is herein referred to as "set of objects". Further, at 103, a request for automatic generation of a list of filter criteria for creating the filter is received. The list of fitter criteria determines which objects in the list of the objects are to be excluded from a filtered list of objects (i.e., filter output). In an embodiment, the user may request the generation of the list of filter criteria by clicking a "create filter" button displayed on the user interface.

At 104, in response to receiving a request to generate the list of filter criteria, the data type of the field values in each field of the set of objects is determined. Each field may contain field values of a single data type or a combination of different data types. To simplify the description to follow, the exemplary list of objects is limited to having fields of four different data types such as date, numeric, alphanumeric/text and logical/Boolean. Persons skilled in the art will appreciate, in light of the information provided herein, that additional (or fewer) fields and/or other field data types may be accommodated.

Further, at 105, a check may be performed to identify whether the determined data type of the field values is logical/Boolean type, date type, alphanumeric/text type or numeric type. In an embodiment, upon determining the data type of the field values, the field value in each field of an object is compared with the field values in each of the corresponding fields of the other objects in the set of objects using operators and/or functions to identify whether the field values across the one or more fields are the same or distinct. For example, the field value in a numeric field (i.e., field having field values of numeric data type) of an object is compared with the field values in the numeric field of the other objects in the set of objects to identify whether the field values across the numeric field are the same or distinct. Techniques for comparing the field value in each field of an object with the field values in each of the corresponding fields of the other objects in the set of objects may vary depending on the determined data type of the field values in the each field. For example, the field value in a numeric field of an object may be compared with the field values in the numerical field of the other objects in the set of objects using "equals (==)" operator to identify whether the field values across the numeric field are the same or distinct. In another example, the field value in a text field of an object (i.e., field having field values of text data type) may be compared with the field values in the text field of other objects in the set of objects using "exact" function which identifies whether the field values across the text field are the same or distinct. Further, in another example, the field value in a date field of an object (i.e., field having field values of date data type) is compared with the field values in the date field of the other objects in the set of objects using "equals (==)" operator upon converting the field values in the date field to its decimal number equivalents. The operators and/or functions used to perform the comparison between field values in the set of objects may vary from one programming language to other programming languages.

In another embodiment, upon determining the data type of the field values in each field, an algorithm for comparing the field values in the each field may be selected based on the data type the field values in the each field. The algorithm determines whether the field values across the each field of the set of objects are the same or distinct. For example, if the data type of the field values in a field is determined to be a numeral, a numeral matching algorithm for comparing the field values of the numeric data type is selected to determine whether the field values across the numeric field are the same or distinct. Likewise, if the data type of the field values in a field is determined to be a text, a text matching algorithm for comparing the field values of the text data type is selected to determine whether the field values across the text field are the same or distinct. Upon selecting the relevant algorithm for comparing the field values in each field of the set of objects, the field value in each field of an object is compared with the field values in each of the corresponding fields of the other objects in the set of objects based on the selected algorithm. In an embodiment, based on the comparison, the selected algorithm may calculate similarity scores for each comparison made between the pair of field values. The similarity scores (S) indicate a degree of similarity between the pair of field values. In an embodiment, the similarity score (S) may be a variable between 0 and 1. The calculated similarity scores for the each comparison in each field may be compared with a threshold value (Th) defined for the corresponding field. Based on comparing the calculated similarity scores (S) and the defined threshold value (Th), the field values across the one or more fields are determined as same if the calculated similarity score for the each comparison is greater than or equal to the threshold value (Th) defined for the corresponding field. On the other hand, if the calculated similarity score (S) for the at least one comparison is less than the threshold value (Th) defined for the corresponding field, then it may be determined that the field values are distinct across the corresponding field.

Further, at 106, upon determining that the type of field values in a field is a Boolean data type, the field value in the Boolean field of an object (i.e., field having field values of the Boolean data type) is compared with the field values in the Boolean field of the other objects in the set of objects. At 107, based on the comparison, a check may be performed to identify whether the field values across the Boolean field of the set of objects are the same or distinct. At 127 (FIG. 1G), upon identifying that the field values across the Boolean field of the set of objects are the same, the field value in the Boolean field is automatically selected as the filter criterion for the Boolean field. For example, if all the field values across the Boolean field of the set of objects are "YES", then "YES" is automatically selected as a filter criterion for the Boolean field. At 108, if at least one field value across the Boolean field of the set of objects is distinct, a frequency of occurrence (X) of the distinct field values (e.g., occurrence of Boolean 'YES' and Boolean 'NO') in the Boolean field are determined. Further, at 109, the determined frequency of occurrences (X) of distinct field values is compared with each other. At 110, based on the comparison, the more frequently occurring field value is identified and presented to the user as the filter criterion for the Boolean field. For example, if the field value "MALE" occurs more number of times than the field value "FEMALE" in "Gender" field (i.e., Boolean field) of the selected set of objects, then the field value "MALE" is automatically selected as a filter criterion for the Boolean field.

In another embodiment, upon identifying that the field values across the Boolean field are distinct, a frequency of occurrence (X) of the distinct field values (e.g., occurrence of Boolean 'YES' and Boolean 'NO') in the Boolean field may be determined. The determined frequency of occurrences (X) of the distinct field values is compared with a threshold value ($Th_b$) defined for the Boolean field. In an embodiment, the defined threshold value ($Th_b$) may depend on the number of field values in the Boolean field. Further, a check may be performed to determine whether the frequency of occurrence (X) of any of the distinct field values is greater than or equal to the threshold value ($Th_b$). If the frequency of occurrences (X) of at least one of the distinct field values is greater than or equal to the threshold value ($Th_b$), then the at least one distinct field value is recommended as a filter criterion for the Boolean field. For example, if the frequency of occurrence of Boolean "YES" is seven times and the frequency of occurrence of Boolean "NO" is two times in the Boolean field of the set of objects, a check may performed to determine whether the frequency of occurrences of Boolean "YES" and Boolean "NO" is greater than the defined threshold value (e.g., five). Upon identifying that the frequency of occurrence of Boolean "YES" is greater than the defined threshold value, a recommendation is generated which may include selecting Boolean "YES" as a filter criterion for the Boolean field. On the other hand, if the frequency of occurrences (X) of the distinct field values in the Boolean field is less than the threshold value ($Th_b$), then no recommendation of a filter criterion is made. Alternatively, both the Boolean values may be presented as a recommendation to the user.

At 111, upon determining that the type of field values in a field is the date data type, the field value (i.e. date value) in the date field of an object (i.e., field having field values of date data type) is compared with the field values in the date field of the other objects in the set of objects. In an embodiment, the date values in the date field of the set of objects are converted to a year-month-day format (YYYY-MM-DD) prior to comparison. At 112, a check may be performed to identify whether the date values across the date field are the same or distinct. At 127 (FIG. 1G), upon identifying that the date values across the date field of the set of objects are the same, the date value in the date field of the set of objects may be automatically selected as a filter criterion for the date field. For example, if all the date values across the date field of the selected set of objects are "2000/01/01", then "2000/01/01" is automatically selected as a filter criterion for the date field. In an embodiment, at 113, if the date values across date field are distinct, then a current date is determined to further assess the date values in the date field. Further, at 114, the difference in time (time period) between each distinct date value in the date field and the current date may be determined. For example, the time difference between a particular date value and a current date may be a single day, a week, a month, etc. At 115, the determined time differences are compared with one or more pre-defined time frames defined with respect to the current date to identify one or more time frames that encompasses the determined time differences. Examples of different pre-defined time frames include "single day", "Last week", "yesterday", "Today", "Last month", "Last quarter" and so on. At 116, based on the comparison, the one or more recommendations including the identified one or more time frames, e.g., "Last week", may be generated for the date field and presented to the user. The user may select one of the time frames, e.g., "Last week", from the presented recommendation as a filter criterion for the date field. For example, if the date value in the date field of "object 1" in a set of three objects is "2014-07-01" (YYYY-MM-DD), the date value in the date field of "object 2" is "2014-07-02" and the date value in the date field of "object 3" is "2014-07-06", then the process involves comparing date values in the date field of each object with the date values in the date field of the other objects in the set of objects to identify whether the date values in the date field of the three objects ("object 1", "object 2" and "object3") are the same or distinct. Upon identifying that the date values in the date field of three objects ("object 1", "object 2" and "object 3") is distinct, the date values in the three objects is compared against the current date, and the time differences between the date values in the three objects ("object 1", "object 2" and "object 3") and the current date is determined. The determined time differences between field values of the three objects ("object 1", "object 2" and "object 3") and the current date is compared to pre-defined time frames. Based on the comparison, a pre-defined time frame "Last week" is identified as encompassing the determined time differences. Accordingly, a recommendation, e.g., "last week" is generated and presented to the user. The user may select the recommendation e.g., "last week" as a filter criterion for the date field.

In another example, electronic mails (also referred to as emails) in a mailbox may be received by a user on different dates. The process involves in comparing the date of receipt of each mail with the dates of receipt of each of the other mails in the mailbox to filter the electronic mils in the mailbox based on the received date of the emails. If the dates of receipt of the entails in the mailbox are distinct, then the date of receipt of each email may be compared with a current date to determine the time difference between the receipt dates of each mail and the current date. The determined time differences between each date of receipt and the current date is compared with pre-defined time frames, and one or more time frames that encompasses the receipt dates is generated as a recommendation to the user. In an embodiment, the selection of one or more time frames from pre-defined time frames are based on identifying the one or more time frames, which are exclusive of other time frames from the pre-defined time frames, encompasses a maximum number of receipt dates. For example, if the date of receipt of email in "object1" of the set of objects is "2014-07-15" (YYYY-MM-DD), date of receipt of email in "object 2" of the set of objects is "2014-07-16", date of receipt of email in "object 3" of the set of objects is "2014-07-17" and the date of receipt of email in "object4" of the set of objects is "2014-07-04", then the process involves comparing date of receipt of email in each object with the date of receipts of emails in each of the other objects to identify whether the date of receipts of emails in four objects ("object1", "object 2", "object3" and "object4") are the same or distinct. Upon identifying that the date of receipt of emails in four objects is distinct, the date of receipts of emails in four objects is compared against a current date (e.g., "2014-07-20") and the time difference between the date of receipt of the emails in the four objects and the current date is determined. Based on the determined time differences, it is identified that the emails in the three objects ("object 1", "object2" and "object3") encompasses a time frame (i.e., Last week). Accordingly, a recommendation (i.e., Last week) is generated and presented to the user. The user may select the presented recommendation (i.e., Last week) as a filter criterion for the date field.

At 117, upon determining that the type of field values in a field is a numeric data type, the field value (i.e. numeric value) in the numeric field of an object (i.e., field having field values of numeric data type) is compared with the field values in the numeric field of the other objects in the set of objects. At 118, based on the comparison, a check may be performed to identify whether the field values across the numeric field of the set of objects are the same or distinct. At 127 (FIG. 1G), in response to identifying that the field values across the numeric field are the same, the numeric value in the numeric field of the set of objects may be automatically selected as a filter criterion for the numeric field. For example, if all the field values across the numeric field in the set of objects are "200", then "200" is automatically selected as a filter criterion for the numeric field. On the other hand, at 119, if the field values across the numeric field are distinct, difference (D) between distinct field values in the numeric field are calculated. Further at 120, a check may be performed to identify whether the calculated differences (D) are less than or equal to a threshold value ($Th_n$) defined for the numeric field. If the calculated differences (D) are less than or equal to the threshold value ($Th_n$) defined for the numeric field, and then it may be identified that the field values across the numeric field are the same. At 121, if the calculated differences (D) are greater than the threshold value ($Th_n$) defined for the numeric field, then the field values in the numeric field are further analyzed. In an embodiment, analysis of distinct field values in the numeric field involves: determining mean, highest number and lowest number of the field values in the numeric field, etc. At 122, based on analysis on the field values in the numeric field, one or more recommendations e.g., "numeric values between the mean and the highest number" may be generated and presented to the user. The user may select the recommendation, e.g., "numeric values between mean and the highest number" as the filter criterion for the numeric field. For example, if the salary (i.e., field value) in the "salary" field (i.e., numeric field) of "object 1" in the set of objects is "1000", the field value in the "salary" field of "object2" in the set of objects is "12000" and the field value in the "salary" field of "object 3" in the set of objects is "14000", then the one or more generated recommendations may include: "salary greater than 14000", "salary less than 1000", "salary between 10000 and 14000", "salary between 12000 and 14000", and so on are generated and presented to the user. For example, the generated recommendation "salary greater than 14000" indicates that the filter output should include the objects having salary greater than "14000", in the salary field.

In another embodiment, upon identifying that the field values across the numeric field are distinct, a frequency of occurrence (Y) of the distinct field values in the numeric field is determined. Further, the determined frequency of occurrences (Y) of distinct field values is compared with each other. Based on the comparison, the one or more frequently occurring field values is identified and presented to the user as a recommendation for the numeric field. For example, if the field value '100' is more frequently occurring in the "Salary" field (i.e., numeric field), then the field value '100' is automatically selected as a recommendation and presented to the user. The user may select the presented recommendation as the filter criterion.

At 123, upon determining that the type of field values in a field is of text data type, the field value (i.e. string) in the text field of an object (i.e., field having field values of text data type) is compared with the field values in the text field of other objects in the set of objects. As stated above, the string in the text field of an object may be compared with the strings in the text field of the other objects in the set of objects using functions to determine whether the strings across the text field are the same or distinct. For example, the "exact" function may be used to compare the string in the text field of an object with the strings in the text field of the other objects in the set of objects. In response to determining that the strings across the text field are the same, the string in the text field of the set of objects is automatically selected as a filter criterion for the text field, For example, if all the strings across the text field in the set of objects are "John", then "John" is automatically selected as a filter criterion for the text field.

In another embodiment, the string in the text field of an object may be compared with the strings in the text field of other objects in the set of objects using text matching algorithms. Examples of text matching algorithms include edit distance algorithm, abbreviation matching algorithm, Jaccard distance algorithm, Trigram algorithm, Token based similarity metric algorithm, or any other algorithm that determines the degree of similarity between strings (i.e., field values in the text field). Based on the comparison between strings using one or more text matching algorithms, similarity scores (S) may be calculated indicating a degree of similarity between strings in the text field. In an embodiment, the similarity scores (S) may be variable between 0 and 1. In an embodiment, prior to performing the comparison, any spacing, punctuations, or any such characters which may not be significant for the comparison, are removed.

In some embodiments, edit distance algorithm may be used to compare the string in the text field of an object with the strings in the text field of the other objects in the set of objects to identify whether the strings across the text field are the same or distinct. Based on the comparison, edit distance algorithm calculates the distance (also referred to as similarity score (S)) between each pair of strings in the text field by determining the number of operations needed to transform one string into another. The operation can be insertion, deletion or a substitution of a single character.

String similarity using edit distance algorithm may be specified in terms of a distance. The distance between pair of strings in the text field is defined as the minimal number of edits required to convert one into another. If two strings are more similar, then the distance between them may be less. For example, the distance between "Boot" and "Boat" is one (1), because it requires a substitution of an 'o' for a 't'.

In some embodiments, the abbreviation matching algorithm may be used to compare the string in the text field of an object with the strings in the text field of other objects in the set of objects to identify whether the strings across the text field are the same or distinct. In some embodiments, pair of strings (i.e. field values in the text field) may be parsed to divide into tokens. Each token from one string may be compared with the corresponding token from other strings using any of the text matching algorithms and weighted to calculate the similarity score (S) indicating the degree of similarity between the pair of strings. For example, if a string in the text field includes an email and a name, then email may be weighted more heavily than a name to calculate similarity score because a conflict with respect to a name may be attributable to a nickname (e.g., Rob versus Robert); whereas conflicting email addresses are more likely to indicate that the strings are not similar (i.e., same).

At 124, a check may be performed to compare the similarity scores (S) calculated using text matching algorithms with a threshold value ($Th_t$) defined for the text field to identify whether the strings across the text field are the same or distinct. In some embodiments, the threshold value ($Th_t$) may be a simple real number between 0 and 1. In some embodiments, the threshold value ($Th_t$) may be generated based on the length of character strings in the text field. If the calculated similarity scores are greater than or equal to the defined threshold value ($Th_t$), then it may be identified that the strings across the text field are same. On the other hand, if the calculated similarity scores (S) are less than the defined threshold value ($Th_t$), then it may be identified that the strings in the text field are distinct. At 127 (FIG. 1G), based on the comparison, if it is identified that the strings across the text field are same, then the string in the text field of the set of objects is automatically selected as the filter criterion for the text field. In an embodiment, if the calculated similarity scores between the strings in the text field are greater than or equal to the defined threshold value, then the selection of a string as the filter criterion, from all the strings in the text field is based on identifying the string having minimum number of characters. For example, if the calculated similarity scores between the strings "play", "plays" and "playstation" of three objects in a text field is greater than or equal to the defined threshold value, then the string "play" is automatically selected as filter criterion for the text field. In another embodiment, if the calculated similarity scores between the strings in the text field are greater than or equal to the defined threshold value, then the selection of a string as the filter criterion, from all the strings in the text field is based on identifying a string which is most similar to all other strings in the text field. The most similar string is identified by calculating an average of similarity scores between each string in the text field with the all other strings in the text field. For example, if the calculated similarity scores between the strings "play", "plays" and "playstation" in a text field of three objects is greater than or equal to the defined threshold value, then a most similar string "plays" is automatically selected as filter criterion for the text field, where an average of similarity scores between the strings "plays" and "play", and "plays" and "playstation" is more compared to the average of similarity scores between the strings "play" and "plays", and "play" and "playstation; and average of similarity scores between the strings "playstation" and "play", and "playstation" and "plays".

In an embodiment if in the strings across the text field are distinct i.e., the calculated similarity scores (S) is less than the defined threshold value (Th.sub.t), then the one or more text matching algorithms may provide additional information related to the strings in the text field. For example, the additional information may include the number of character string occurrences in distinct strings in the text field, the similarity level or other information. In an embodiment, at 125, the character strings that are more likely occurring in the strings in the text field are identified. Based on the identification, one or more recommendations, e.g. "strings (field values) including the identified character strings" are generated and presented to the user 126. The user may select the one or more recommendations from the presented recommendations as the filer criterion for the text field. For example, if the string in a text field of "object 1" in the selected set of objects is "John T smith" and the string of text field of "object 2" in the selected set of objects is "John T", then a recommendation is provided to the user to select the filter criteria for the text field as "John T", i.e., to filter the objects having character string "John T" the strings of the text field.

As stated above, at 127, the list of filter criteria may be automatically generated based on the field values that are same across the one or more fields of the set of objects. For example, if the field value "MALE" is same across the "Gender" field of the set of objects, then "MALE" is automatically selected as a filter criterion for the "Gender" field. The list of filter criteria may include filter criterion generated for the one or more fields. For example, the list of filter criteria may include the filter criterion generated for the Boolean field, the numeric field, the date field and the text field. In an embodiment, the list of filter criteria may also include one or more recommendations generated based on the data type of the field values in the one or more fields of the set of objects.

Further, at 128, in an embodiment, the filter may be created using the generated list of filter criteria. In an embodiment, the user may request to update the list of filter criteria prior to creating the filter. In response to the user request to update the list of filter criteria, the list of filter criteria may be updated to generate an updated list of filter criteria. For example, the user may select and/or de-select one or more filter criteria from the generated list of filter criteria. In another example, the user may update or select a particular number/date from a one or more recommendations generated for the numeric/date fields respectively. Further, in another example, the user may update the at least one filter criterion from the generated list of filter criteria. Upon generating the updated list of filter criteria, the user may create a fitter using the updated list of filler criteria.

At 129, upon creating the filter, the user may apply the filter to the list of objects by clicking a "Filter" button displayed on the user interface. In response to the user request to apply the filter to the list of objects, the filter is applied to the list of objects to generate a filtered list of objects. Applying the filter to the list of objects includes comparing the field values across the one or more fields of the list of objects with the one or more filter criteria in the created filter. For example, field values in the Boolean field are compared with the filter criterion generated for the Boolean field, field values in the numeric field are compared with the filter criterion generated for the numeric field and so on. Based on the comparison, one or more objects corresponding to the field values that satisfy the one or more filter criteria are identified. Upon identifying one or more objects, the filtered list of objects (i.e., filter output) including identified one or more objects is generated and presented to the user 130. In an embodiment, the filtered list of objects may be presented to the user with a different user interface.

In an embodiment, the user may request for updating the created filter or for updating the pre-defined filters. In response to the user request, the process involves in displaying the filter comprising the list of filter criteria on a user interface. The user interface may provide an option to the user to update the filter. Updating the filler includes updating at least one filer criteria from the generated list of filter criteria, and selecting and/or de-selecting the one or more fields to be included in the filter prior to applying the filter to the list of objects, i.e., to filter out the list of objects based on the filter criteria of the selected one or more fields. In an embodiment, the user may also select or de-select the one or more fields by checking or unchecking the checkbox associated with one or more fields. In response to completion of the updating of the filter, the list of filter criteria may be updated. The updated list of filler criteria will be saved, but not applied to the list of objects until the user requests to apply the filter. Updated list of filter criteria may be further updated or all the updates may be cancelled prior to the user requesting to apply the updated list of filler criteria to the list of objects.

FIGS. 2 to 5 provides a visual representation of an embodiment in the process of creating a filter for a list of objects. FIG. 2 is an exemplary user interface 200 depicting a tabular view of the list of objects retrieved from a data source, according to an embodiment. In particular, FIG. 2 depicts the list of objects associated with an exemplary employee database. For reasons of brevity, only a portion of the exemplary employee database is shown in the FIG. 2 to discuss the embodiments illustrated in the FIGS. 1A to 1G. In an embodiment, the list of objects may be displayed in a form of a table comprising plurality of rows and columns. Each row in the displayed table represents an object. The columns are also referred to as fields. Each field may be labeled at column headers to indicate the semantic meaning of field values displayed below in the corresponding fields. As shown in the FIG. 2, the displayed table has seven fields labeled and referenced as: "Emp ID" 201, "EMP Name" 202, "Gender" 203, "Hire date" 204, "Department" 205, "Salary" 206 and "Job type" 207. The user interface 200 may receive selection of one or more objects from the displayed list of the objects. For example, the user interface 200 may provide an option for the user to select or de-select one or more objects from the list of objects. In an embodiment, each object from the list of objects is associated with a check box 208. The user may select or de-select an object from the list of the objects by selecting or de-selecting the check box associated with the object. The selected one or more objects is herein referred to as "set of objects". The user may process the set of objects by clicking the "create filter" button 209 as shown in the FIG. 2. Clicking the "create filter" button 209 triggers the automatic generation of a list of fitter criteria. The filter tray be created using the generated list of filter criteria. The list of filter criteria determines which objects in the list of the objects are to be included in a filtered list of objects (i.e., filter output).

In an embodiment, the user may select all the check boxes associated with the list of objects displayed on the user interface 200 by clicking a "check all" button 210. Further, the user may also de-select all check boxes associated with the list of objects by clicking a "clear all" button 211 displayed on the user interface 200. Selecting and de-selecting check boxes using the check all button 210 and clear all button 211 has the same effect as individually selecting or de-selecting an object.

In an embodiment, the user may create a new object by clicking a new button 212 displayed on the user interface 200. Further, the user may also edit individual field values in the fields of an object by clicking on "edit" button 213. Further the user interface 200 may include a "Filter" button 214 to apply the created filter or pre-defined filters to the of the objects. Furthermore, the user may actuate a "Close" button 215 to close the user interface 200.

FIG. 3 is an exemplary user interface depicting a filter 300 created for filtering a list of objects, according to an embodiment. In an embodiment, the user interface depicting the filter 300 which may be invoked upon a user clicking the "create filter" button 209 displayed on the user interface 200. In another embodiment, the filter may be invoked by selecting the one of the pre-defined filters for filtering the list of objects. Notably, the filter 300 contains a data entry field 305 for defining a filter name and generated list of filter criteria 310. As shown in the filter 300, the generated list of filter criteria 310 includes a filter criterion generated for the "Gender", "Department", and "Job type" fields. As stated above, the filter criterion is generated for the "Gender", "Department", and "Job type" fields based on the same field values in the "Gender", "Department", and "Job type" fields respectively. The filter 300 further includes and an area 315 for defining conditions. In an embodiment, the conditions area 315 include several checkboxes, one checkbox for each field for specifying whether the field to be included in the filtering operation or not. By selecting a check box associated with the field, the user indicates that the selected field to be included in the filtering operation, i.e., to filter out the list of objects based on the filter criteria 310 of the corresponding field.

It can be noted that the generated filter criterion for the "Gender" field shown in the FIG. 3 is same as the field values (i.e., Male) across the "Gender" field of the set of objects displayed on the user interface 200. Further, the generated filter criterion for the "Department" field shown in the FIG. 3 is same as the field values (i.e., Administration) across the "Department" field of the set of objects displayed on the user interface 200, and also the generated filter criterion for the "Job type" field shown in the FIG. 3 is same as the field values (i.e., Permanent) across the "Job type" field of the set of objects displayed on the user interface 200. In an embodiment, the user may edit at least one filter criterion from the list of filter criteria 310 in the filter 300. In an embodiment, at least one filter criterion from the list of filter criteria 310 may be edited by clicking an "edit" button 320 displayed on the user interface 300. For example, the user may edit the filter criterion of the "Gender" field by changing it to "Female" from "Male", thereby indicating that the filter 300 output may include objects having field value "Female" in the "Gender" field of the filtered list of objects. In another embodiment, the filter 300 may also include a "save" button 325. The user may save the edited information by clicking the "save" button 325. In response to receiving a request to save the filter 300, the filter 300 may be saved. In another embodiment, the user may click a "Cancel" button 330 and thereby the edited information may not be saved. Further, the user may also name the filter 300 by defining a name in the data entry field 305. For example, as shown in the FIG. 3, the filter 300 is named as "Male Admin Per". In an embodiment, the user may access the filter 300 by specifying the filter name.

FIG. 4 is an exemplary user interface 400 depicting a tabular view of a filtered list of objects (i.e., filter output), according to an embodiment. In an embodiment, a user may apply the filter 300 to the list of objects displayed on the user interface 200 by clicking the "filter" button 214 displayed on the user interface 200. Clicking the "Filter" button 214 triggers the automatic generation of the filtered list of objects (i.e., filter output) by applying the filter 300 to the list of objects. It can be noted that the field values across the "Gender" field of the filtered list of objects is same as the field values across the "Gender" field of the set of objects (i.e., selected objects) displayed on the user interface 200. Further, the field values across the "Department" field of the filtered list of objects is same as the field values across the "Department" field of the set of objects displayed on the user interface 200. Furthermore, the field values across the "Job type" field of the filtered list of objects is same as the field values across the "Job type" field of the set of objects displayed on the user interface 200. Further, it can be noted that the field values across the "Gender", "Department" and "Job type" fields of the filtered list of objects displayed on the user interface 400 are equal to the generated filter criterion for the "Gender", "Department" and "Job type" fields respectively, as shown in the filter 300. In an embodiment, the user interface may provide an option to create another filter to further filter the filtered list of objects by automatically generating a list of filter criteria based on the one or more objects in the filtered list of objects. The user may select one or more objects from the filtered list of objects by checking a check box 410 associated with each of the filtered list of objects, and may trigger the automatic generation of the list of filter criteria based on the selected objects by clicking the create filter button 420 displayed on the user interface 400.

Figure 5:
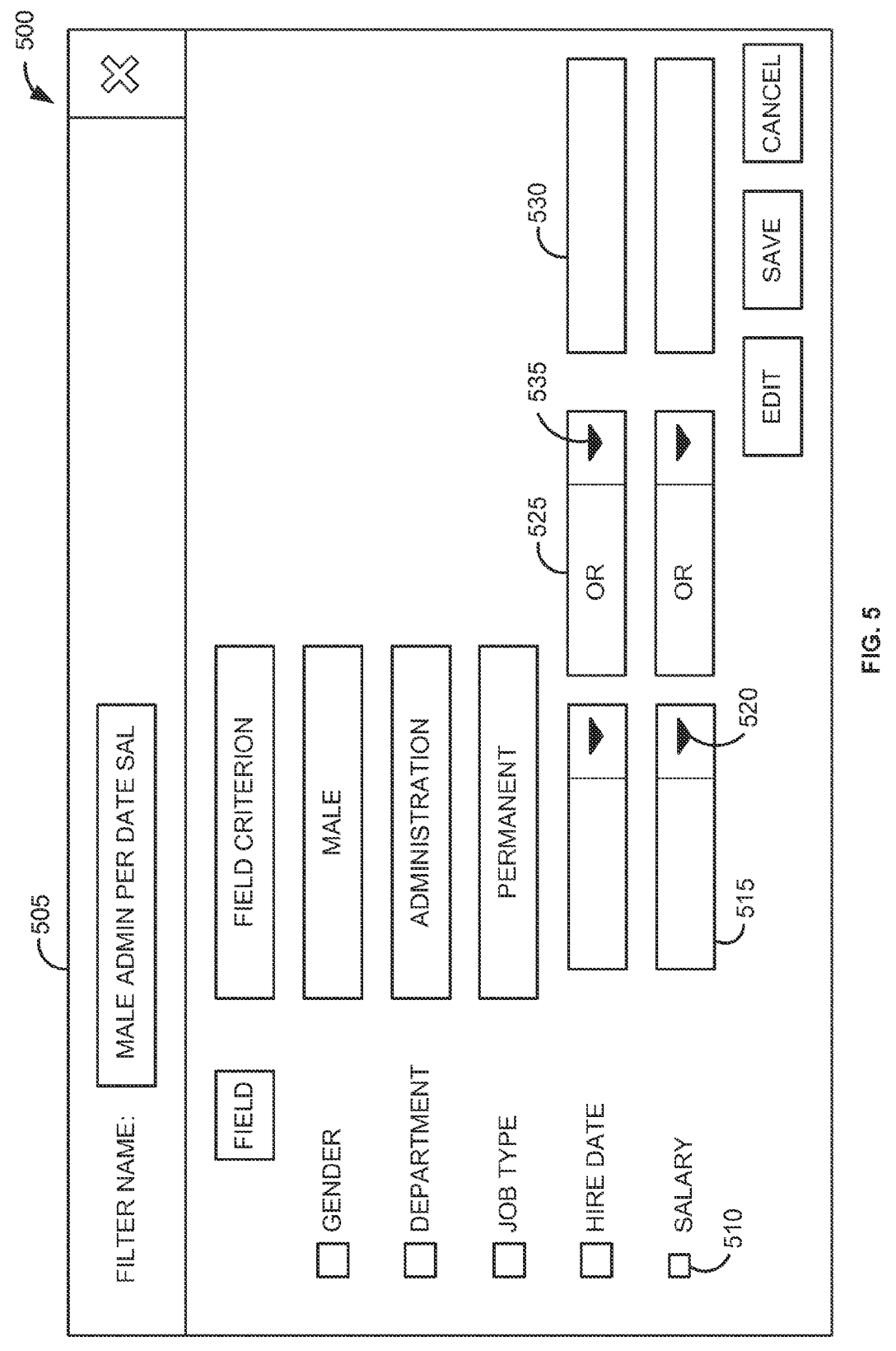

FIG. 5 is an exemplary user interface depicting a filter 500 created for filtering a list of objects, according to an embodiment. In an embodiment, the user interface depicting the filter 500 which may be invoked upon a user clicking the "filter" button 214 displayed on the user interface. In another embodiment, the filter 500 may be invoked by selecting one of the pre-defined filters for filtering the list of objects. Notably, the filter 500 contains a data entry field 505 for defining a filter name and generated list of filter criteria. As can be seen in FIG. 5, the list of filter criteria includes filter criterion generated for the "Gender" "Department", and "Job type" fields based on the same field values in the "Gender", "Department" and "Job type" fields respectively. Further, the list of filter criteria includes one or more recommendations generated for the "Hire date" and "Salary" fields based on the type of the field values in the "Hire date" and "Salary" fields respectively. As stated above, the one or more recommendations may be generated for the one or more fields, if the field values across the one or more fields are distinct. For reasons of brevity, the filter 500 of FIG. 5 includes one or more recommendations generated for the "Hire date" and "Salary" fields. However, the generated recommendations for the other fields (i.e., "Emp ID" field and "Emp Name") having distinct field values may also be accommodated in the fitter 500. The filter 500 further includes an area 510 for defining conditions. In an embodiment, the area for defining conditions include several checkboxes, one checkbox for each field for selecting whether the field to be included in the filtering operation or not. By selecting the check box associated with the field, the user indicates that the selected field to be included in the filtering operation, i.e., to filter out the list of objects based on the filter criterion of the selected field. For example, a user may select the "Gender" and "Department" fields by clicking the check boxes associated with the corresponding fields, and thereby indicating that the "Gender" and "Department" fields are included in the filtering operation, i.e., to filter out the list of objects based on the filter criterion of the "Gender" and "Department" fields. As can be seen in FIG. 5, the generated filter criteria for the "Gender", "Department" and "Job type" fields are "Male", "Administration" and "Permanent" respectively.

Further, the one or more recommendations generated for the "Hire date" and "Salary" fields may be presented to the user as drop down menus 515. Each drop down menu 515 may be associated with a control button 520. When the control button 520 associated with the drop down menu 515 is pressed, the drop down menu 515 may be displayed to the user. The drop down menu 515 associated with the "Hire date" field includes the one or more generated recommendations for the "Hire date" field. Further, the drop down menu 515 associated with the "Salary" field includes the one or more generated recommendations for the "Salary" field. For example, the one or more recommendations generated for the "Hire date" field includes "Last day", "Last year", "Last month", "and Last week", and so on. By selecting the one or more recommendations in the drop down menus 515 associated with the "Hire date" and "Salary" fields, the user can set the filter criterion for the respective fields.

In an embodiment, the user interface 500 may provide an option to the user for editing the filter. For example, the user may edit the filter criterion of the "Gender" field by redefining it to "Female" from "Male", thereby indicating that the filter output should include objects having field value "Female" in the "Gender" field.

The filter 500 also includes a Boolean operator box 525 associated with the "Hire date" and "salary" fields. The Boolean operator box 525 permits the entry of Boolean operator that can be used to string together multiple filter criteria. For example, for the "Hire date" field, either the user may manually set the filter criterion by selecting the recommendation from the one or more recommendations or the user may manually define the filter criterion in the provided data entry field 530. Notably, the Boolean operator box 525 may be switched between "OR" and "AND" entries by the use of a toggle button 535. In an alternative embodiment, any other Boolean operator may be used in the Boolean operator box 525. Further, the user may also name the filter by defining a name in the data entry field 505. For example, as shown in the FIG. 5, the filter is named as "Male Admin Per Date Sal". In an embodiment, the user can access the filter by specifying the filter name.

Figure 6:
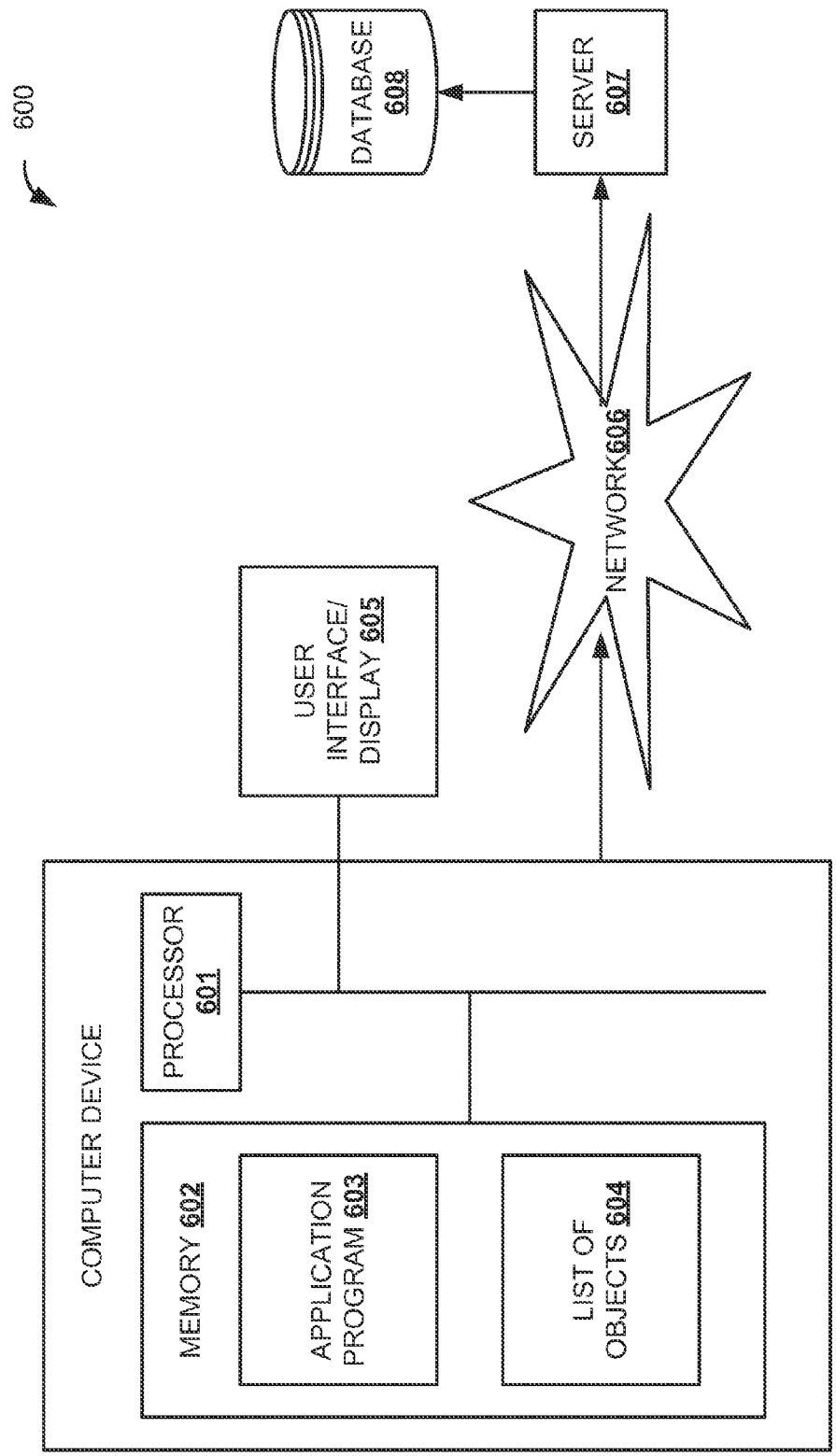
FIG. 6 is a block diagram of an exemplary system for creating a filter for filtering a list of objects, according to an embodiment.

FIG. 6 is a block diagram of an exemplary system 600 of creating a filter for filtering a list of objects, according to one embodiment. The system 600 includes a one or more processors 601 for managing and processing data and operations consistent with disclosed embodiments. The system 600 may be communicatively connected to a communication network 606 and issues data requests to a server 607. In response to receiving such requests over the communication network 606, the server 607 selects, from a database 608, actual data that satisfy criteria specified by the data request. In an embodiment, the database 608 may be an integral part of the system 600. The communication network 606 may be any wired or wireless network capable of conduction communication between functional modules. Server 607 may be one or more server computers configured to perform one or more operations consistent with the disclosed embodiments.

The system 600 may also include a memory 602 coupled to the processor(s) 601. As shown in FIG. 6, the memory 602 may store an application program 603 and a list of objects 604 retrieved from the database 608. In an embodiment, the list of objects may be retrieved from word processor documents, spreadsheet programs and the like. In an embodiment, the application program 603 may be configured to create a filter for the list of objects, as described in the flow diagram 100. In some embodiments, the application program 603 may be executed on the server 607 for creating the filter for the list of objects 604.

The processor 601 may retrieve the list of objects directly from the database 608 over the communication network 606. In some embodiments, the retrieved of objects may be encapsulated in a data file (e.g., Extensible Markup Language (XML) file, Excel spreadsheet, Comma Separated Values (CSV) file, etc.). In some embodiments, the processor 601 may retrieve the of objects from word processor documents, spreadsheets and the like. The processor 601 then processes the list of objects using the application program 603 stored in the memory 602 to perform the process described with reference to FIG. 1. Further, the processor 601 can transmit the data between other components of the system.

In an embodiment, the processor 601 executes software instructions or code for creating a filter for filtering a list of objects, stored on a computer readable storage medium, to perform the above illustrated process. The system 600 includes a media reader to read the instructions from the computer readable storage medium and store the instructions in storage or in random access memory (RAM). For example, the computer readable storage medium includes executable instructions for performing operations including, but not limited to, retrieving a list of objects composed of one or more fields having field values, receiving a selection of set of objects from the list of objects, receiving a request to automatically generate a list of filter criteria, comparing the field value of each field of an object with the field values in each of the corresponding fields of the other objects in the set of objects, generating the list of filter criteria and creating the filter using the generated list of fitter criteria.

The system 600 may also comprise a display 605. The display 605 may be any of various types such as LCD (liquid crystal display), a CRT (cathode ray tube) display, etc.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing high-level code that is executed by a computer using an interpreter. For example, an embodiment may be implemented using Java, C++, or other object-oriented programming language and development tools. Another embodiment may be implemented in hard-wired circuitry in place of, or in combination with machine readable software instructions.

FIG. 7 is a block diagram of an exemplary computer system 700. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, all of the data required for processing may be stored in the RAM 715. The stored instructions may be further compiled to generate other representations of the instructions and dynamically stored in the RAM 715. The processor 705 reads instructions from the RAM 715 and performs the actions as instructed. According to one embodiment, the computer system 700 further includes an output device 725 (e.g., a display) to provide at least some of the results of the execution as output, including, but not limited to, visual information to users and an input device 730 to provide a user or other device with an option for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source 760 is an information resource. Data sources 760 include sources of data that enable data storage and retrieval. Data sources 760 may include databases, such as, relational, transactional, hierarchical, multi-dimensional (e.g., OLAP), object oriented databases, and the like. Further data sources 760 include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source 760 accessible through an established protocol, such as, Open Database Connectivity (ODBC), produced by an underlying software system (e.g., Enterprise Resource Planning (ERP) system), and the like. Data sources 760 may also include a data source 760 where the data is not tangibly stored or otherwise ephemeral such as data streams, the broadcast data, and the like. These data sources 760 can include associated data foundations, semantic layers, management systems, security systems and so on.

In the above description, numerous specific details are set forth to provide a thorough understanding of embodiments. One skilled in the relevant art will recognize, however, that the embodiments can be practiced without one or more of the specific details, or with other methods, components, techniques, etc. In other instances, well-known operations or structures are not shown or described in detail.

Although the processes illustrated and described herein include a series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer-implemented method of creating a filter for filtering a list of objects composed of one or more fields having field values, the method comprising:
   retrieving the list of objects from a database stored in a computer memory;
   at a user interface, receiving a selection of a set of objects from the list of objects;
   receiving a request at a computer processor to automatically generate a list of filter criteria;
   in response to the request, the computer processor comparing values of one or more pluralities of corresponding fields of the set of objects, wherein the comparing includes:
   determining a data type of values of a plurality of corresponding fields of the set of objects;
   based on the determined data type, comparing the values of the plurality of corresponding fields of the set of objects with each other, wherein:
   when the data type is Boolean, determining a frequency of occurrence of each distinct value of the values of the plurality of corresponding fields of the set of objects,
   when the data type is Date, determining a time difference between a current date and each distinct value of the values of the plurality of corresponding fields of the set of objects,
   when the data type is Numeric, calculating a numeric difference between distinct values of the values of the plurality of corresponding fields of the set of objects, and
   when the data type is Text, determining a similarity score between each pair of the values of the plurality of corresponding fields of the set of objects;
   based on the comparison, the computer processor automatically generating the list of filter criteria based on at least one of the determined frequency of occurrence, the determined time difference, the calculated numerical difference and the determined similarity score;
   displaying the list of filter criteria at the user interface;
   receiving an update to the list of filter criteria at the user interface;
   in response to the update, generating an updated list of filter criteria;
   creating the filter using the updated list of filter criteria;
   applying the filter to the list of objects in the database to generate a filtered list of objects; and
   displaying the filtered list of objects on the user interface.

2. The method as claimed in claim 1, wherein selecting the set of objects comprises:
   displaying the retrieved list of objects on a user interface; and
   providing an option to a user at the user interface to select and de-select one or more objects from the displayed list of objects.

3. The method as claimed in claim 1, wherein the applying the created filter on the list of objects comprises:
   comparing field values across the list of objects with one or more filter criteria from the list of filter criteria in the created filter;
   based on the comparison, identifying one or more objects corresponding to field values that satisfy the one or more filter criteria; and
   generating a filtered list of objects including the identified one or more objects.

4. The method as claimed in claim 1, wherein the method further comprises:
   receiving a request to update the list of filter criteria prior to applying the filter to the list of objects.

5. A non-transitory computer readable storage medium to tangibly store instructions, which when executed by a computer, cause the computer to:
   retrieve a list of objects from a database;
   at a user interface, receive a selection of a set of objects from the list of objects;
   receive a request to automatically generate a list of filter criteria;

in response to the request, compare values of one or more pluralities of corresponding fields of the set of objects, wherein the comparing includes:

determine a data type of values of a plurality of corresponding fields of the set of objects;

based on the determined data type, compare the values of the plurality of corresponding fields of the set of objects with each other, wherein:

when the data type is Boolean, determine a frequency of occurrence of each distinct value of the values of the plurality of corresponding fields of the set of objects, when the data type is Date, determine a time difference between a current date and each distinct value of the values of the plurality of corresponding fields of the set of objects, when the data type is Numeric, calculate a numeric difference between distinct values of the values of the plurality of corresponding fields of the set of objects, and when the data type is Text, determine a similarity score between each pair of the values of the plurality of corresponding fields of the set of objects;

based on the comparison, generate automatically the list of filter criteria based on at least one of the determined frequency of occurrence, the determined time difference, the calculated numerical difference and the determined similarity score;

display the list of filter criteria at the user interface;

receive an update to the list of filter criteria at the user interface;

in response to the update, generate an updated list of filter criteria;

create the filter using the updated list of filter criteria;

apply the filter to the list of objects in the database to generate a filtered list of objects; and display the filtered list of objects on the user interface.

6. The non-transitory computer readable storage medium of claim 5, wherein the instructions further cause the computer to:

display the list of objects on the user interface; and provide an option to a user at the user interface to select and de-select one or more objects from the displayed list of objects.

7. The non-transitory computer readable storage medium of claim 5, wherein the instructions further cause the computer to:

compare field values across the list of objects with one or more filter criteria from the list of filter criteria in the created filter;

based on the comparison, identify one or more objects corresponding to the field values that satisfy the one or more filter criteria; and generate the filtered list of objects including the identified one or more objects.

8. The non-transitory computer readable storage medium of claim 5, wherein the instructions further cause the computer to:

receive a request to update the list of filter criteria prior to applying the filter to the list of objects.

9. A computer system for creating a filter for the list of objects, the computer system comprising:

a memory to store program code; and a processor communicatively coupled to the memory, the processor configured to execute the program code to:

retrieve a list of objects from a database;

at a user interface, receive a selection of a set of objects from the list of objects;

receive a request to automatically generate a list of filter criteria;

in response to the request, compare values of one or more pluralities of corresponding fields of the set of objects, wherein the comparing comprises:

determine a data type of values of a plurality of corresponding fields of the set of objects;

based on the determined data type, compare the values of the plurality of corresponding fields of the set of objects with each other, wherein:

when the data type is Boolean, determine a frequency of occurrence of each distinct value of the values of the plurality of corresponding fields of the set of objects, when the data type is Date, determine a time difference between a current date and each distinct value of the values of the plurality of corresponding fields of the set of objects, when the data type is Numeric, calculate a numeric difference between distinct values of the values of the plurality of corresponding fields of the set of objects, and when the data type is Text, determine a similarity score between each pair of the values of the plurality of corresponding fields of the set of objects;

based on the comparison, generate automatically the list of filter criteria based on at least one of the determined frequency of occurrence, the determined time difference, the calculated numerical difference and the determined similarity score;

display the list of filter criteria at the user interface;

receive an update to the list of filter criteria at the user interface;

in response to the update, generate an updated list of filter criteria;

create the filter using the updated list of filter criteria;

apply the filter to the list of objects in the database to generate a filtered list of objects; and display the filtered list of objects on the user interface.

10. The system as claimed in claim 9, wherein the processor further executes the program code to:

retrieve the list of objects upon a request;

display the retrieved list of objects within a user interface;

provide an option to select the set of objects from the displayed list of objects;

receive a request to select the set of objects from the list of objects; and in response to the request, select the set of objects from the list of the objects using the option.

11. The system as claimed in claim 9, wherein the processor further executes the program code to:

compare field values across the list of objects with one or more filter criteria from the list of filter criteria in the created filter;

based on the comparison, identify one or more objects corresponding to the field values that satisfy the one or more filter criteria; and generate the filtered list of objects including the identified one or more objects.

12. The system as claimed in claim 9, wherein the processor further executes the program code to:

receive a request to update the list of filter criteria prior to applying the filter to the list of objects.

* * * * *